US012603955B2

(12) United States Patent
Gilbert-Eyres et al.

(10) Patent No.: US 12,603,955 B2
(45) Date of Patent: Apr. 14, 2026

(54) SYSTEM AND METHOD FOR HANDLING OF A SERVICE REQUEST

(71) Applicant: GM Global Technology Operations LLC, Detroit, MI (US)

(72) Inventors: Matthew Edward Gilbert-Eyres, Rochester Hills, MI (US); Eric T. Hosey, Rochester Hills, MI (US); Russell A. Patenaude, Macomb Township, MI (US); Robert Myers, Canton, MI (US)

( * ) Notice: Subject to any disclaimer, the term of this patent is extended or adjusted under 35 U.S.C. 154(b) by 147 days.

(21) Appl. No.: 18/411,979

(22) Filed: Jan. 12, 2024

(65) Prior Publication Data

US 2025/0233942 A1 Jul. 17, 2025

(51) Int. Cl.
*H04M 3/51* (2006.01)
*G06Q 30/015* (2023.01)
*G07C 5/00* (2006.01)
*H04M 1/72454* (2021.01)

(52) U.S. Cl.
CPC ........ *H04M 3/5116* (2013.01); *G06Q 30/015* (2023.01); *G07C 5/008* (2013.01); *H04M 1/72454* (2021.01)

(58) Field of Classification Search
CPC ........................ H04M 3/5116; H04M 1/72454
See application file for complete search history.

(56) References Cited

U.S. PATENT DOCUMENTS

2020/0029194 A1* 1/2020 Speaker ................ H04W 4/027

FOREIGN PATENT DOCUMENTS

| CN | 101206787 B | * | 10/2011 | .......... G08B 25/016 |
|---|---|---|---|---|
| DE | 102013112449 A1 | | 5/2014 | |
| DE | 102016213435 A1 | | 1/2018 | |
| DE | 102020103851 A1 | | 8/2021 | |
| DE | 102020205508 A1 | | 11/2021 | |
| DE | 102021111142 A1 | | 4/2022 | |

* cited by examiner

*Primary Examiner* — Amal S Zenati
(74) *Attorney, Agent, or Firm* — Honigman LLP; Matthew H. Szalach; Jonathan P. O'Brien

(57) ABSTRACT

A computer-implemented method that, when executed by data processing hardware, causes the data processing hardware to perform operations. The operations include detecting a low-impact event of a vehicle, receiving one or more service request handling inputs, assigning a service request handling pathway to the low-impact event based on the service request handling inputs, initiating a service request, assigning a service request cancellation period to the service request based on the handling pathway, determining whether a cancellation request is received within the service request cancellation period, and either cancelling the service request when the cancellation request is received within the service request cancellation period or transmitting the service request to a service provider when the cancellation request is not received within the service request cancellation period.

16 Claims, 4 Drawing Sheets

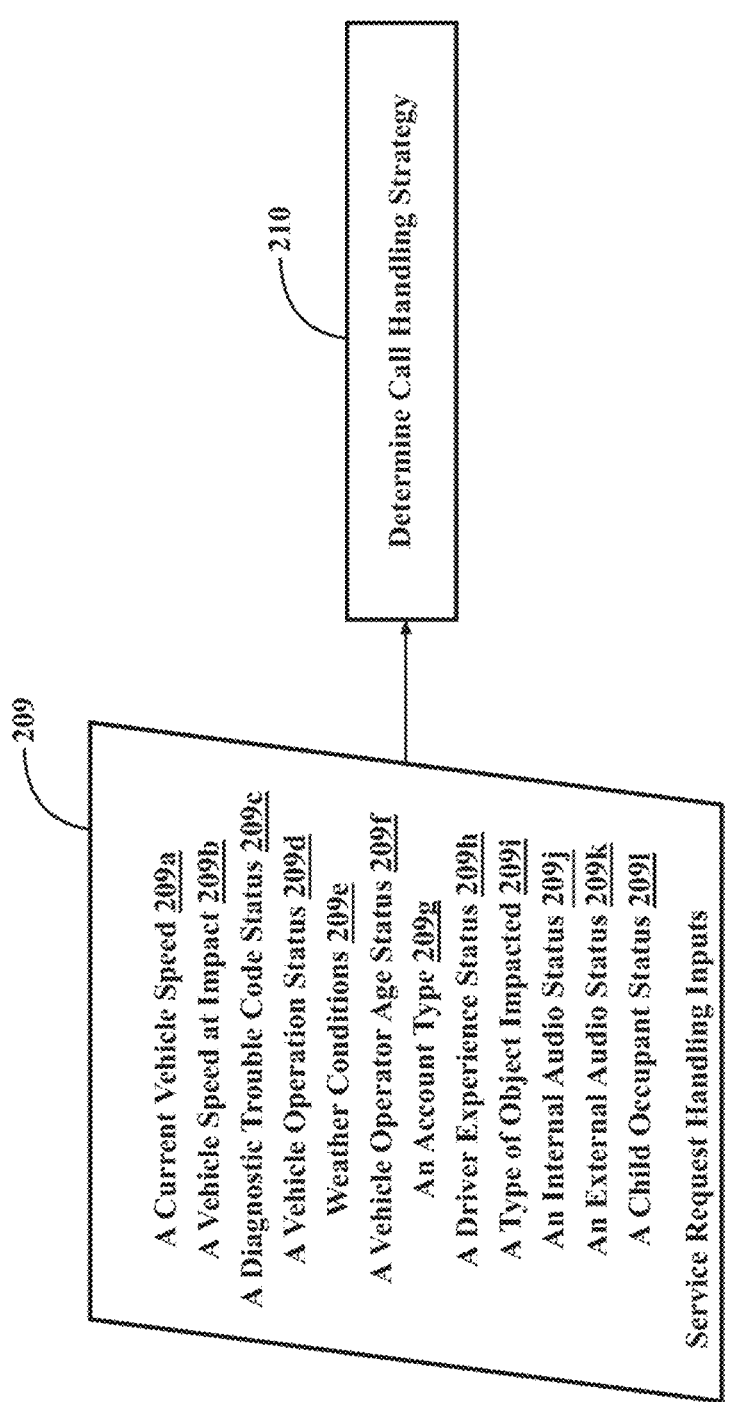

209

A Current Vehicle Speed 209a
A Vehicle Speed at Impact 209b
A Diagnostic Trouble Code Status 209c
A Vehicle Operation Status 209d
Weather Conditions 209e
A Vehicle Operator Age Status 209f
An Account Type 209g
A Driver Experience Status 209h
A Type of Object Impacted 209i
An Internal Audio Status 209j
An External Audio Status 209k
A Child Occupant Status 209l Service Request Handling Inputs

210

Determine Call Handling Strategy

FIG. 4

SYSTEM AND METHOD FOR HANDLING OF A SERVICE REQUEST

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a system and method for handling of a service request, and more particularly, assigning a call pathway to an event based on one or more inputs.

Some vehicles are equipped with a crash detection system that is configured to contact emergency services automatically upon the occurrence of an event (e.g., when a vehicle's air bags are deployed). There are other scenarios, sometimes referred to as low-impact events, which are not accounted for by these systems. Some low-impact events may result in an automatic request for emergency services while other low-impact events may allow an operator to have discretion as to whether a call for emergency services should be placed. The shortcomings of existing systems and methods for triaging emergency calls may be addressed while maintaining a high standard of emergency triage and ensuring customer satisfaction.

SUMMARY

In one configuration, a computer-implemented method that, when executed by data processing hardware, causes the data processing hardware to perform operations is provided. The operations include detecting a low-impact event of a vehicle, receiving one or more service request handling inputs, assigning a service request handling pathway to the low-impact event based on the service request handling inputs, initiating a service request, assigning a service request cancellation period to the service request based on the handling pathway, determining whether a cancellation request is received within the service request cancellation period, and either cancelling the service request when the cancellation request is received within the service request cancellation period or transmitting the service request to a service provider when the cancellation request is not received within the service request cancellation period.

The method may include one or more of the following aspects or steps. For example, the one or more service request handling inputs includes at least one of the following: a current vehicle speed, a vehicle speed at impact, a diagnostic trouble code status, a vehicle operation status, a vehicle operator age status, a type of object impacted, weather conditions, a child occupant status, an internal audio status, an account type, a driver experience status, or an external audio status. A first handling pathway may be assigned to the low-impact event if the speed of impact was greater than a first threshold, the driver is a teenager, the vehicle is being operated under a fleet account, children are present in the vehicle, the vehicle is an autonomous vehicle, a large object impact was detected, diagnostic trouble codes are present, or external audio indicates damage occurred. A second handling pathway may be assigned to the low-impact event if the speed of impact was less than a first threshold but greater than a second threshold, the driver is inexperienced, the vehicle is a non-autonomous vehicle, keywords were detected within the vehicle, a small object impact was detected, or weather conditions are present. A third handling pathway may be assigned to the low-impact event if the vehicle is still moving, no object impact was detected, or no keywords were detected. The first pathway may be a high severity pathway, the second pathway may be a medium severity pathway, and third pathway may be a low severity pathway. When more than one of the first pathway, the second pathway, or the third pathway are assigned to the low-impact event, the highest severity pathway assigned may be used to assign the service request cancellation period to the service request.

In another configuration, a system is provided and includes data processing hardware and memory hardware in communication with the data processing hardware, the memory hardware storing instructions that, when executed on the data processing hardware, cause the data processing hardware to perform operations. The operations include detecting a low-impact event of a vehicle, receiving one or more service request handling inputs, assigning a service request handling pathway to the low-impact event based on the service request handling inputs, initiating a service request, assigning a service request cancellation period to the service request based on the handling pathway, determining whether a cancellation request is received within the service request cancellation period, and either cancelling the service request when the cancellation request is received within the service request cancellation period or transmitting the service request to a service provider when the cancellation request is not received within the service request cancellation period.

The system may include one or more of the following aspects. For example, the one or more service request handling inputs includes at least one of the following: a current vehicle speed, a vehicle speed at impact, a diagnostic trouble code status, a vehicle operation status, a vehicle operator age status, a type of object impacted, weather conditions, a child occupant status, an internal audio status, an account type, a driver experience status, or an external audio status. A first handling pathway may be assigned to the low-impact event if the speed of impact was greater than a first threshold, the driver is a teenager, the vehicle is being operated under a fleet account, children are present in the vehicle, the vehicle is an autonomous vehicle, a large object impact was detected, diagnostic trouble codes are present, or external audio indicates damage occurred. A second handling pathway may be assigned to the low-impact event if the speed of impact was less than a first threshold but greater than a second threshold, the driver is inexperienced, the vehicle is a non-autonomous vehicle, keywords were detected within the vehicle, a small object impact was detected, or weather conditions are present. A third handling pathway may be assigned to the low-impact event if the vehicle is still moving, no object impact was detected, or no keywords were detected. The first pathway may be a high severity pathway, the second pathway may be a medium severity pathway, and third pathway may be a low severity pathway. When more than one of the first pathway, the second pathway, or the third pathway are assigned to the low-impact event, the highest severity pathway assigned may be used to assign the service request cancellation period to the service request.

In another configuration, a vehicle management system is provided and includes a communication system, data processing hardware, and memory hardware in communication with the data processing hardware, the memory hardware storing instructions that, when executed on the data processing hardware, cause the data processing hardware to perform operations. The operations include detecting a low-impact event of a vehicle, receiving one or more service request handling inputs, assigning a service request handling pathway to the low-impact event based on the service request handling inputs, initiating a service request, assigning a service request cancellation period to the service request based on the handling pathway, determining whether a cancellation request is received within the service request cancellation period, and either cancelling the service request when the cancellation request is received within the service request cancellation period or transmitting the service request to a service provider when the cancellation request is not received within the service request cancellation period.

The vehicle management system may include one or more of the following aspects. For example, the one or more service request handling inputs includes at least one of the following: a current vehicle speed, a vehicle speed at impact, a diagnostic trouble code status, a vehicle operation status, a vehicle operator age status, a type of object impacted, weather conditions, a child occupant status, an internal audio status, an account type, a driver experience status, or an external audio status. A first handling pathway may be assigned to the low-impact event if the speed of impact was greater than a first threshold, the driver is a teenager, the vehicle is being operated under a fleet account, children are present in the vehicle, the vehicle is an autonomous vehicle, a large object impact was detected, diagnostic trouble codes are present, or external audio indicates damage occurred. A second handling pathway may be assigned to the low-impact event if the speed of impact was less than a first threshold but greater than a second threshold, the driver is inexperienced, the vehicle is a non-autonomous vehicle, keywords were detected within the vehicle, a small object impact was detected, or weather conditions are present. A third handling pathway may be assigned to the low-impact event if the vehicle is still moving, no object impact was detected, or no keywords were detected. The first pathway may be a high severity pathway, the second pathway may be a medium severity pathway, and third pathway may be a low severity pathway. When more than one of the first pathway, the second pathway, or the third pathway are assigned to the low-impact event, the highest severity pathway assigned may be used to assign the service request cancellation period to the service request.

BRIEF DESCRIPTION OF THE DRAWINGS

The drawings described herein are for illustrative purposes only of selected configurations and are not intended to limit the scope of the present disclosure.

FIG. 4 is a detailed view of the flow diagram of FIG. 3, showing service request handling inputs.

Corresponding reference numerals indicate corresponding parts throughout the drawings.

DETAILED DESCRIPTION

Figure 1:
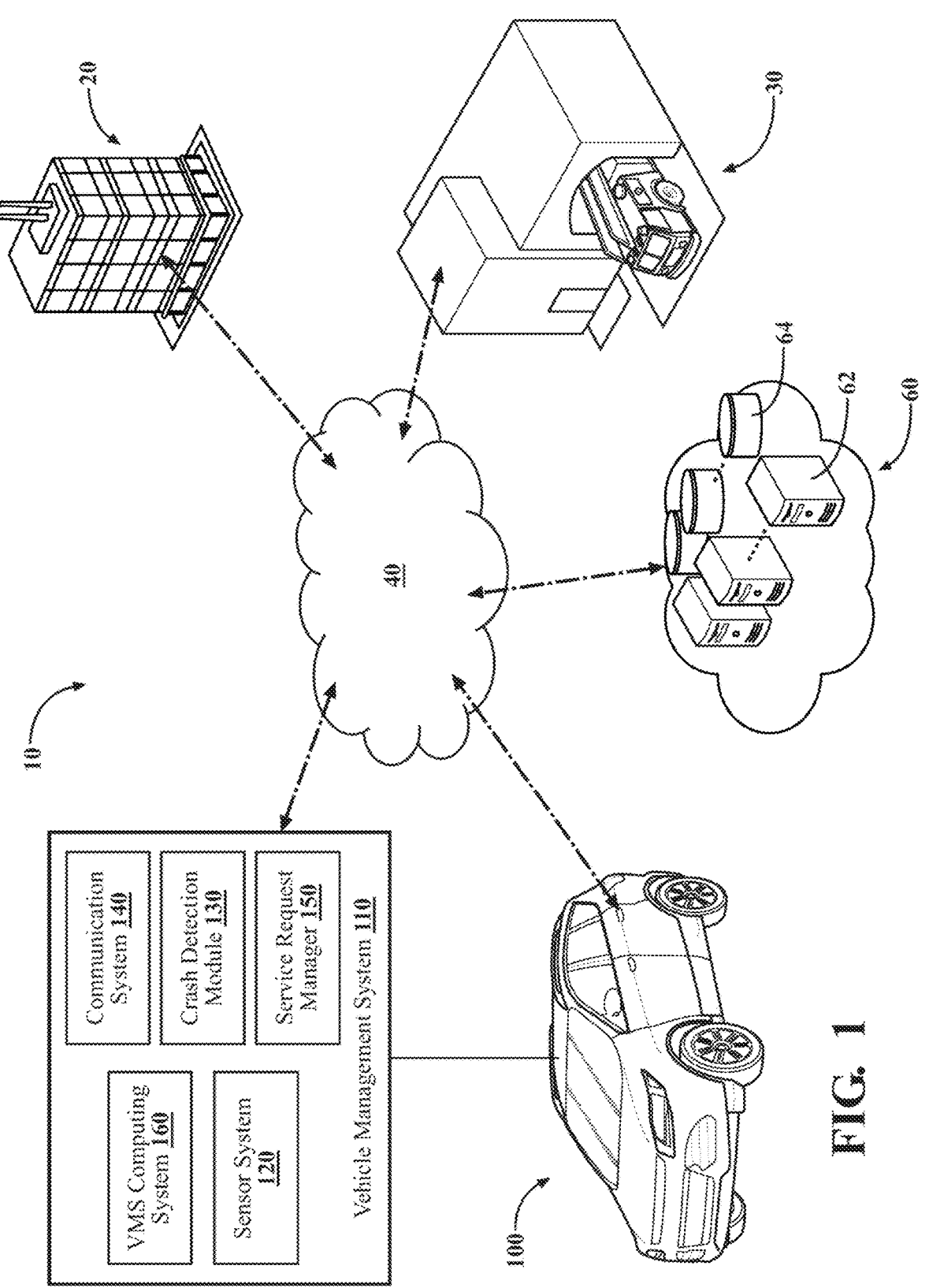
FIG. 1 is a schematic diagram of a vehicle environment including a vehicle management system according to the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIG. 1, an example vehicle operating environment 10 is provided for illustration of the principles of the present disclosure. The vehicle operating environment 10 includes a vehicle 100, a vehicle service center 20, and a vehicle service provider 30. For the sake of illustration, the vehicle operating environment 10 is shown as including a single vehicle service center 20 and a single vehicle service provider 30. However, in other examples, the vehicle operating environment 10 may include a plurality of vehicle service centers 20 and vehicle service providers 30 in communication over a network 40 (e.g., the Internet, cellular networks). Vehicle service providers 30 may include emergency service providers, such as fire, medical, or law enforcement services, or vehicle maintenance services, such as repair or towing services.

Figure 2:
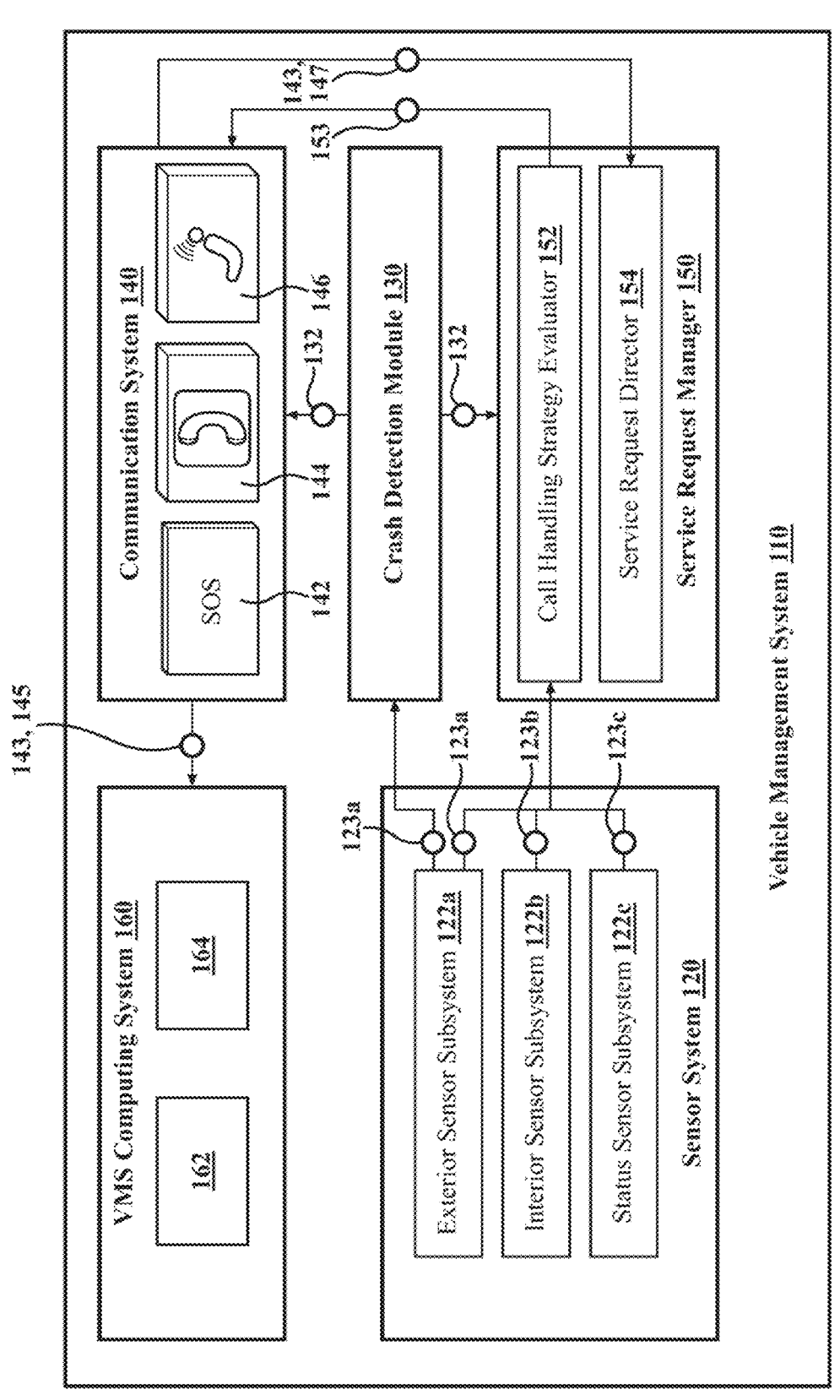
FIG. 2 is an enlarged schematic diagram showing an example of the vehicle management system according to the principles of the present disclosure.

With reference to FIGS. 1 and 2, the vehicle 100 includes a vehicle management system 110 including a sensor system 120, a crash detection module 130, a communication system 140, and a service request manager 150. While the vehicle 100 maneuvers about the environment 10, the sensor system 120 includes various sensor subsystems 122, 122a-122c configured to gather sensor data 123, 123a-123c relating to characteristics of the environment 10 and/or status of the vehicle 100. For instance, the sensor subsystems 122 include a vehicle exterior sensor subsystem 122a configured to measure or obtain external environmental data 123a, such as weather or surrounding objects (e.g., vehicles, pedestrians), an interior sensor subsystem 122b configured to measure interior environmental data 123b, such as vehicle occupancy, and/or a vehicle status subsystem 122c configured to measure or obtain vehicle operating data 123c, such as vehicle location and operating parameters. As the sensor system 120 gathers the sensor data 123, a computing system 160 is configured to store, process, and/or communicate the sensor data 123 within the vehicle operating environment 10. In order to perform computing tasks related to the sensor data 123, the computing system 160 of the vehicle 100 includes data processing hardware 162 and memory hardware 164. The data processing hardware 162 is configured to execute instructions stored in the memory hardware 164 to perform computing tasks related to operation and management of the vehicle 100. Generally speaking, the computing system 160 refers to one or more locations of data processing hardware 162 and/or memory hardware 164.

In some examples, the computing system 160 is a local system located on the vehicle 100 (e.g., vehicle control unit). When located on the vehicle 100, the computing system 160 may be centralized (i.e., in a single location/area on the vehicle 100, for example, a vehicle control unit), decentralized (i.e., located at various locations about the vehicle 100), or a hybrid combination of both (e.g., with a majority of centralized hardware and a minority of decentralized hardware). To illustrate some differences, a decentralized computing system 160 may allow processing to occur at an activity location (e.g., at the communication system 140) while a centralized computing system 160 may allow for a central processing hub that communicates to systems located at various positions on the vehicle 100 (e.g., communicate to the communication system 140).

Additionally or alternatively, the computing system 160 includes computing resources that are located remotely from the vehicle 100. For instance, the computing system 160 may communicate via the network 40 with a remote vehicle computing system 60 (e.g., a remote computer/server or a cloud-based environment). Much like the computing system 160, the remote vehicle computing system 60 includes remote computing resources such as remote data processing hardware 62 and remote memory hardware 64. Here, sensor data 123 or other processed data (e.g., data processing locally by the computing system 160) may be stored in the remote vehicle computing system 60 and may be accessible to the computing system 160. In some examples, the computing system 160 is configured to utilize the remote resources 62, 64 as extensions of the computing resources 162, 164 such that resources of the computing system 160 may reside on resources of the remote vehicle computing system 60.

The communication system 140 of the vehicle 100 provides an interface for facilitating communication, both locally at the vehicle 100 and externally to the single vehicle service center 20 and service providers 30 via the network 40. In the illustrated example, the communication system 140 includes one or more communication buttons 142, 144, 146, including an emergency (SOS) service request button 142, a service call button 144, and an interior voice command button 146 for providing voice commands to the vehicle management system 110. The communication buttons 142, 144, 146 may be embodied as physical buttons integrated into the vehicle interior (e.g., steering wheel, rear-view mirror) or as rendered buttons integrated into a touch-sensitive graphical user interface (e.g., vehicle infotainment system). Accordingly, the communication buttons 142, 144, 146 are easily accessible to a vehicle occupant. The communication system 140 may communicate with the computing system 160 and/or the remote vehicle computing system 60. The communication system 140 may also communicate with the crash detection module 130 and the service request manager 150 so that when a low-impact event 132 arises, a corresponding support service request 143 arises and a call request 145 may be initiated.

With continued reference to FIGS. 1 and 2, the vehicle management system 110 includes the service request manager 150, which is executed at the local computing system 160 and/or the remote vehicle computing system 60 in the manner previously described. The service request manager 150 is configured to receive data indicating the low-impact event 132 from the crash detection module 130 and to determine a severity for the support service request 143 based on the sensor data 123, 123a-123c provided by the sensor system 120. More particularly, the service request manager 150 includes a call handling strategy evaluator 152 configured to receive the sensor data 123, 123a-123c, determine a severity of a low-impact event based on the sensor data 123, 123a-123c, and assign a handling pathway to the low-impact event 132 that dictates whether or not to provide cancellation instructions 153 to the vehicle occupant via a vehicle user interface. The support service request 143 request initiated as a result of the low-impact event 132 may be cancelled by engagement of the service call button 144 if the low-impact event 132 is assigned a pathway where cancellation instructions 153 are provided to the vehicle occupant. Upon engagement of the service call button 144 or a separate support service request button for cancelling the support service request 143, a cancellation request 147 is generated and sent to the service request director 154 to be evaluated.

Figure 3:
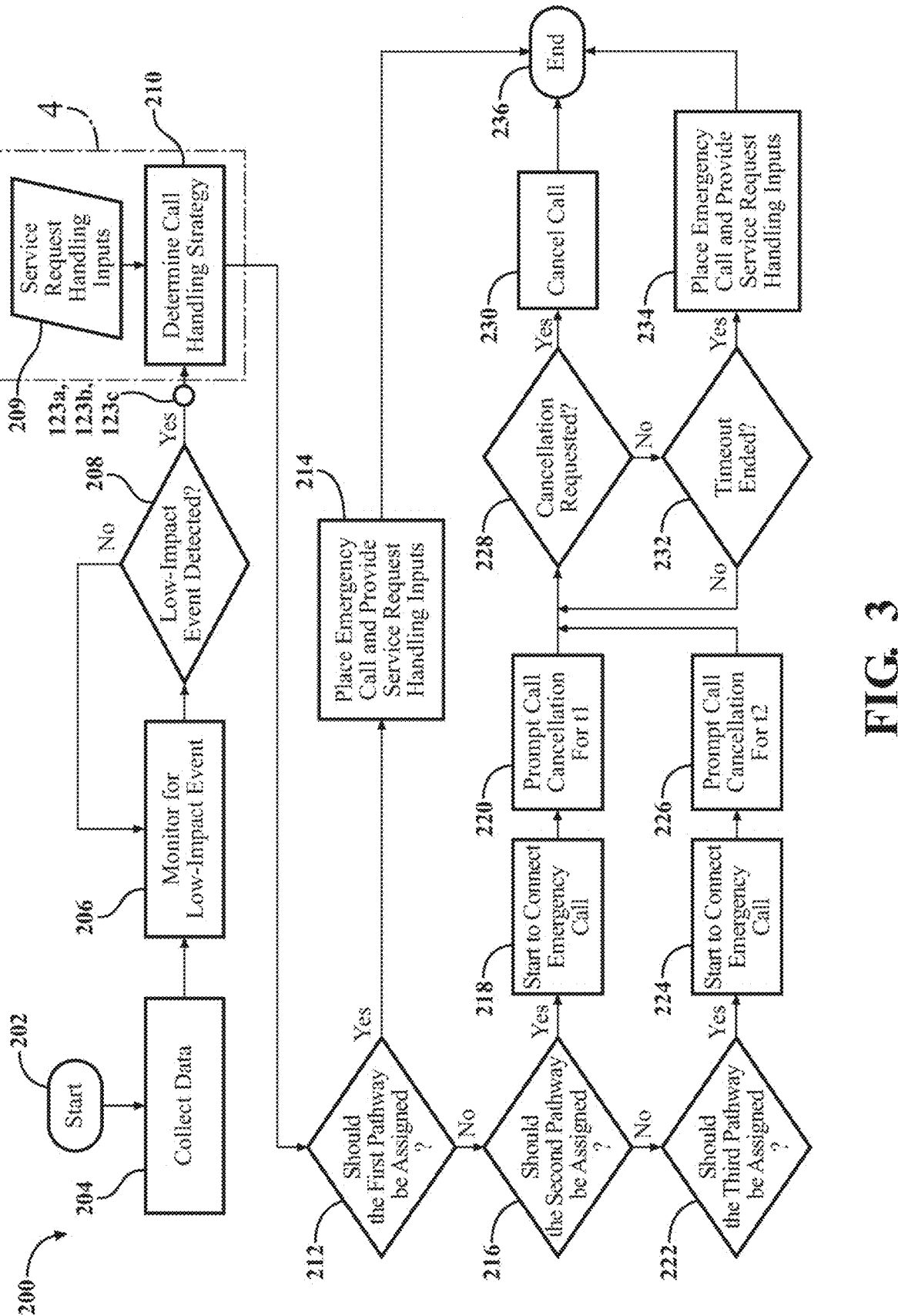
FIG. 3 is a flow diagram showing operations of the vehicle management system of FIG. 2.

Referring to FIGS. 3 and 4, a method 200 for determining whether or not to assign cancellation instructions 153 after a vehicle detects the low-impact event 132 and initiates the support service request 143 is provided. At a first step 202, the method 200 is initiated. In practical terms, the method 200 may be initiated upon powering-up of the vehicle 100 by the vehicle operator.

At step 204, the sensor system 120 begins collecting the sensor data 123, 123a-123c from one or more of the exterior sensor subsystem 122a, the interior sensor subsystem 122b, and the vehicle status subsystem 122c. As discussed in greater detail below, the sensor data 123, 123a-123c may be utilized by the call handling strategy evaluator 152 as service request handling inputs 209 for determining the call handling strategy.

At step 206, the vehicle management system 110 (e.g., the crash detection module 130) monitors the sensor system 120 for low-impact events and determines whether the low-impact event 132 has occurred at step 208. When the vehicle management system 110 determines that the low-impact event 132 has not occurred, the vehicle management system 110 continues monitoring the sensor system 120 for any indication of the low-impact event 132. Conversely, when the vehicle management system 110 determines that the low-impact event 132 has occurred, the vehicle management system 110 proceeds to step 210 where the call handling strategy may be subsequently or simultaneously determined.

At step 210, the call handling strategy is determined. In this example, the call handling strategy evaluator 152 receives indication of the low-impact event 132 from the crash detection module 130 and the sensor data 123, 123a-123c as service request handling inputs 209. The call handling strategy evaluator 152 may be configured or programmed with handling pathway criteria or an assessment strategy which evaluates whether or not and which of the service request handling inputs 209 are subsequently or simultaneously present at the time the low-impact event 132.

By way of example, some of the service request handling inputs 209, 209a-209l that may be present at the time of a low-impact event may include one or more of the following. A current vehicle speed 209a or a vehicle speed at impact 209b may be determined through use of a vehicle dynamics sensor such as a longitudinal accelerometer or vehicle wheel speed sensor, for example. A diagnostic trouble code status 209c may be provided by the sensor system 120 (e.g., by the sensor status subsystem) or by another system within the vehicle management system 110. A vehicle operation status 209d (e.g., autonomous or non-autonomous vehicle) and weather conditions 209e (e.g., snowing, raining, hailing, etc.) may be determined at the vehicle management system 110 (e.g., the computing system 160). A vehicle operator age status 209f, an account type 209g, and/or a driver experience status 209h may be determined based on a vehicle profile selected by an operator or an owner of the vehicle 100. For instance, a driver profile may be selected that represents a driver is a teenager and, when the low-impact event 132 arises, the vehicle operator age status 209f and/or the driver experience status 209h will be provided to the call handling strategy evaluator 152 for determining which handling pathway should be assigned. Additionally, if the vehicle 100 is a fleet vehicle, the owner of the vehicle 100 can select a profile which indicates the same. A type of object impacted 209i may be determined using one or more of the sensors (e.g., a camera or a radar) coupled to the exterior sensor subsystem 122a. The type of object impacted 209i may include data indicating a size of the object impacted (i.e., small, medium, large) and may also include data for classifying the object impacted (e.g., a rock, an animal, a person, another vehicle, a building, etc.). Internal and external audio detected by one or more microphones arranged on the interior and/or exterior vehicle 100 may be used to provide an internal audio status 209j and/or an external audio status 209k. A child occupant status 209l may be determined by one or more sensors which may include seat weight sensors, cameras, or radar, for example.

With respect to the call handling strategy, any one of inputs 209 or others may be associated with a first or high severity handling pathway, a second or medium severity handling pathway, or a third or low severity handling pathway. As will be discussed in more detail below, the support service request 143 to the vehicle service provider 30 will be handled according to which pathway is assigned to the low-impact event 132. The first handling pathway may be assigned if one or more of the following is present at the time of the low-impact event 132. First, the first pathway may be assigned to the low-impact event 132 if the speed of impact 209b was greater than a first threshold. The first threshold may be a vehicle speed greater than 20 mph, for example. The first handling pathway may be assigned if the driver profile provides a vehicle operator age status 209f which indicates the driver is a teenager or an account type 209g which indicates that the vehicle 100 is being operated under a fleet account. If the computing system 160 indicates that the vehicle 100 is being operated autonomously then the third handling pathway may be assigned to the low-impact event 132. If any one of the sensors 122a-122c of the sensor system 120 of the vehicle 100 provides the diagnostic trouble code status 209c, which indicates diagnostic trouble codes are present, the child occupant status 209l, which indicates that children are present in the vehicle 100, or a type of object impacted 209i that indicates a large object was impacted, then the first handling pathway may be assigned to the low-impact event 132. The foregoing list is provided for exemplary purposes and is not an exhaustive list of criteria associated with the first handling pathway.

The second handling pathway may be assigned if one or more of the following is present at the time of the low-impact event 132. First, if the speed of impact 209b was less than the first threshold but greater than a second threshold. As mentioned above, the first threshold may be a speed greater than 20 mph and the second threshold may be a speed between 5 mph and 20 mph, for example. Note, the speed associated with these thresholds may vary slightly outside of these ranges but are nonetheless associated with what is considered to be a low-impact event. The second handling pathway may be assigned if the driver profile provides the driver experience status 209h which indicates that the driver is inexperienced. Also, if the computing system 160 or another system within the vehicle management system 110 indicates that the vehicle operation status 209d is a non-autonomous vehicle or that weather conditions are present (e.g., snowing, hailing, high winds, etc.), then the second handling pathway may be assigned to the low-impact event 132. If the internal audio status 209j indicates that certain keywords such as "help," "call 911," "call an ambulance," or "call EMS," etc. were detected by one of the sensors 122a-122c, then the second handling pathway may be assigned to the low-impact event 132. If the type of object impacted 209i indicates a small object (e.g., a rock, an animal, a pothole, etc.) was impacted, then the second handling pathway may be assigned to the low-impact event 132. The foregoing list is provided for exemplary purposes and is not an exhaustive list of criteria associated with the second handling pathway.

The third handling pathway may be assigned if one or more of the following is present at the time of the low-impact event 132. If the current vehicle speed 209a indicates that the vehicle 100 is still moving, the third handling pathway may be assigned to the low-impact event 132. Likewise, if no object impact was detected by the sensor system 120, the third handling pathway may be assigned to the low-impact event 132. Also, if no keywords were detected by the vehicle 100, the third handling pathway may be assigned to the low-impact event 132. The foregoing list is provided for exemplary purposes and is not an exhaustive list of criteria associated with the third handling pathway.

The call handling evaluator 152 may be configured such that in the event that there are several service request inputs 209 detected at the time of the low-impact event 132 and the inputs 209 indicate more than one handling pathway should be assigned, the pathway of highest severity will be assigned to the low-impact event 132. For instance, if the driver profile of the vehicle 100 indicates that the vehicle 100 is being operated under a fleet account (i.e., a first pathway criteria) and the internal audio status 209j indicates that keywords are present (i.e., a second pathway criteria), then the first pathway will be assigned to the low-impact event 132 because the first pathway is more severe than the second pathway.

At step 212, the service request manager 150 evaluates whether one or more of the service request inputs 209 matches one or more of the first pathway criteria. If one or more of the service request handling inputs 209 matches one or more of the first pathway criteria, then the method 200 proceeds to step 214. If, on the other hand, the service request manager 150 determines that one of the first pathway criteria is not present, the method 200 proceeds to step 216.

At step 214, the communication system 140 will immediately initiate the support service request 143 and a call request 145. At this point, because the first handling pathway was assigned to the low-impact event 132, the operator will not be prompted with cancellation instructions 153 and will not be provided any time to generate the cancellation request 147. Once the service request is completed, the method 200 will end at step 236.

At step 216, the service request manager 150 evaluates whether one or more of the service request inputs 209 matches one or more of the second pathway criteria. If one or more of the service request handling inputs 209 matches one or more of the second pathway criteria, the method 200 proceeds to step 218. If, on the other hand, the service request manager 150 determines that one of the second pathway criteria is not present, the method 200 proceeds to step 222.

At step 218, the communication system 140 initiates the support service request 143 but does not immediately generate a call request 145.

At step 220, the operator of the vehicle 100 is prompted with instructions that an emergency call (i.e., call request 145) is going to be placed if the operator does not cancel the request within a time period t1. The time period t1 may be 5 seconds, between 1 and 5 seconds, or between 3 and 5 seconds, for example. The time period t1 to generate the cancellation request 147 may begin upon completion of the cancelation instructions 153 or otherwise when the service request manager 150 is configured to do so.

At step 222, the service request manager 150 evaluates whether one or more of the service request inputs 209 matches one or more of the third pathway criteria. If one or more of the service request handling inputs 209 matches one or more of the third pathway criteria, the method 200 proceeds to step 224.

At step 224, the service request manager 150 initiates a request to connect an emergency call.

At step 226, the operator of the vehicle 100 is prompted with instructions that an emergency call is going to be placed if the operator does not cancel the request within a time period t2. The time period t2 may be between 5 and 10 seconds, between 7 and 15 seconds, or greater than 5 seconds, for example. The time period t2 to generate the cancellation request 147 may begin upon completion of the cancelation instructions 153 or otherwise when the service request manager 150 is configured to do so.

At step 228, the service request manager 150 (e.g., the service request director) monitors for the cancellation request 147 within the time allotted in steps 220 or 226. If a cancellation request 147 is received by the service request manager 150, the method 200 proceeds to step 230.

At step 230, the support service request 143 that was initiated by the low-impact event 132 is cancelled by the service request manager 150 and no call request 145 is placed to the vehicle service provider 30.

At step 232, depending on the pathway assigned to the low-impact event 132, the service request manager 150 will simultaneously monitor for a cancellation request 147 and for expiration of the time period t1 or t2. Thus, if no cancelation request 147 is received at step 228 and the time period allotted expires in step 232, the support service request 143 that was initiated by the low-impact event 132 is not cancelled by the service request manager 150 and a call request 145 is placed to the vehicle service provider 30.

At step 234, the call request 145 will be placed and the service request handling inputs 209 associated with the low impact event will be provided to the vehicle service provider 30.

Finally, once the call request 145 to the vehicle service provider 30 is completed, the method 200 ends at step 236.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method that, when executed by data processing hardware, causes the data processing hardware to perform operations comprising:

detecting a low-impact event of a vehicle;

receiving one or more service request handling inputs;

assigning at least one service request handling pathway to the low-impact event based on the service request handling inputs subsequently or simultaneously present when the low-impact event is detected, the service request handling pathways include a first handling pathway, a second handling pathway, and a third handling pathway;

initiating a service request;

dynamically assigning, via a call handling strategy evaluator, a service request cancellation period to the service request based on the assigned service request handling pathway, the first handling pathway having a first service request cancellation period of zero (0) seconds, the second handling pathway having a second service request cancellation period that is greater than the first service request cancellation period, and the third handling pathway having a third service request cancellation period that is greater than the first and second service request cancellation periods;

when the second or third handling pathways is assigned, prompting an operator of the vehicle with the service request cancellation period assigned;

determining whether a cancellation request is received within the service request cancellation period; and either (i) cancelling the service request when the cancellation request is received within the service request cancellation period or (ii) transmitting the service request to a service provider when the cancellation request is not received within the service request cancellation period.

2. The method of claim 1, wherein the one or more service request handling inputs includes at least one of the following:

a current vehicle speed;

a vehicle speed at impact;

a diagnostic trouble code status;

a vehicle operation status;

a vehicle operator age status;

a type of object impacted;

weather conditions;

a child occupant status;

an internal audio status;

an account type;

a driver experience status; or an external audio status.

3. The method of claim 2, wherein the first handling pathway is assigned to the low-impact event if the speed of impact was greater than a first threshold, the driver is a teenager, the vehicle is being operated under a fleet account, children are present in the vehicle, the vehicle is an autonomous vehicle, a large object impact was detected, diagnostic trouble codes are present, or external audio indicates damage occurred.

4. The method of claim 3, wherein the second handling pathway is assigned to the low-impact event if the speed of impact was less than a first threshold but greater than a second threshold, the driver is inexperienced, the vehicle is a non-autonomous vehicle, keywords were detected within the vehicle, a small object impact was detected, or weather conditions are present.

5. The method of claim 4, wherein the third handling pathway is assigned to the low-impact event if the vehicle is still moving, no object impact was detected, or no keywords were detected.

6. The method of claim 5, wherein the first handling pathway is a high severity pathway, the second handling pathway is a medium severity pathway, and the third handling pathway is a low severity pathway.

7. The method of claim 6, wherein when more than one of the first handling pathway, the second handling pathway, or the third handling pathway is assigned to the low-impact event, the highest severity pathway assigned is used to assign the service request cancellation period to the service request.

8. A system comprising:

data processing hardware; and memory hardware in communication with the data processing hardware, the memory hardware storing instructions that, when executed on the data processing hardware, cause the data processing hardware to perform operations comprising:

detecting a low-impact event of a vehicle;

receiving one or more service request handling inputs;

assigning at least one service request handling pathway to the low-impact event based on the service request handling inputs subsequently or simultaneously present when the low-impact event is detected, the service request handling pathways include a first handling pathway, a second handling pathway, and a third handling pathway;

initiating a service request;

dynamically assigning, via a call handling strategy evaluator, a service request cancellation period to the service request based on the assigned service request handling pathway, the first handling pathway having a first service request cancellation period of zero (0) seconds, the second handling pathway having a second service request cancellation period that is greater than the first service request cancellation period, and the third handling pathway having a third service request cancellation period that is greater than the first and second service request cancellation periods;

when the second or third handling pathways is assigned, prompting an operator of the vehicle with the service request cancellation period assigned;

determining whether a cancellation request is received within the service request cancellation period; and either (i) cancelling the service request when the cancellation request is received within the service request cancellation period or (ii) transmitting the service request to a service provider when the cancellation request is not received within the service request cancellation period.

9. The system of claim 8, wherein the one or more service request handling inputs includes at least one of the following:

a current vehicle speed;

a vehicle speed at impact;

a diagnostic trouble code status;

a vehicle operation status;

a vehicle operator age status;

a type of object impacted;

weather conditions;

a child occupant status;

an internal audio status;

an account type;

a driver experience status; or an external audio status.

10. The system of claim 9, wherein the first handling pathway is assigned to the low-impact event if the speed of impact was greater than a first threshold, the driver is a teenager, the vehicle is being operated under a fleet account, children are present in the vehicle, the vehicle is an autonomous vehicle, a large object impact was detected, diagnostic trouble codes are present, or external audio indicates damage occurred.

11. The system of claim 10, wherein the second handling pathway is assigned to the low-impact event if the speed of impact was less than a first threshold but greater than a second threshold, the driver is inexperienced, the vehicle is a non-autonomous vehicle, keywords were detected within the vehicle, a small object impact was detected, or weather conditions are present.

12. The system of claim 11, wherein the third handling pathway is assigned to the low-impact event if the vehicle is still moving, no object impact was detected, or no keywords were detected.

13. The system of claim 12, wherein the first handling pathway is a high severity pathway, the second handling pathway is a medium severity pathway, and the third handling pathway is a low severity pathway.

14. The system of claim 13, wherein when more than one of the first handling pathway, the second handling pathway, or the third handling pathway is assigned to the low-impact event, the highest severity pathway assigned is used to assign the service request cancellation period to the service request.

15. The system of claim 8, further comprising a communication system configured for facilitating communication to vehicle service centers and service providers via a network.

16. The system of claim 8, wherein the system is a vehicle management system.

\* \* \* \* \*